United States Patent
Käfer

(10) Patent No.: US 7,235,223 B2
(45) Date of Patent: *Jun. 26, 2007

(54) METHOD FOR OPERATING A FLUE GAS PURIFICATION PLANT

(75) Inventor: Gisbert Wolfgang Käfer, Birmenstof (CH)

(73) Assignee: Alstom Technology Ltd., Baden (CH)

( * ) Notice: Subject to any disclaimer, the term of this patent is extended or adjusted under 35 U.S.C. 154(b) by 678 days.

This patent is subject to a terminal disclaimer.

(21) Appl. No.: 10/660,521

(22) Filed: Sep. 12, 2003

(65) Prior Publication Data

US 2004/0052711 A1    Mar. 18, 2004

(30) Foreign Application Priority Data

Sep. 14, 2002  (DE)  ................. 102 42 776

(51) Int. Cl.
*B01D 53/56* (2006.01)
(52) U.S. Cl. .............. 423/239.1; 423/244.09; 423/247
(58) Field of Classification Search ........ 423/235, 423/239.1, 244.1, 244.09, 247
See application file for complete search history.

(56) References Cited

U.S. PATENT DOCUMENTS

| | | | | |
|---|---|---|---|---|
| 4,012,488 | A | * | 3/1977 | Brocoff ............. 423/244.04 |
| 4,804,522 | A | * | 2/1989 | Hass ............... 423/235 |
| 5,599,758 | A | | 2/1997 | Guth et al. |
| 5,665,321 | A | * | 9/1997 | Campbell et al. ..... 423/210 |
| 5,953,911 | A | | 9/1999 | Guth et al. ........ 60/295 |
| 2002/0128147 | A1 | | 9/2002 | Kaefer ............. 502/34 |

FOREIGN PATENT DOCUMENTS

| | | |
|---|---|---|
| DE | 197 53 573 | 6/1999 |
| DE | 100 49 801 | 10/2000 |
| DE | 100 49 040 | 6/2002 |
| WO | 01/51178 | 7/2001 |

OTHER PUBLICATIONS

Czarnecki, L., et al., "SCONOx™—Ammonia Free NOx Removal Technology For Gas Turbines", Proceedings of 2000 International Joint Power Generation Conference, Miami Beach, FL, Jul. 23-26, 2000, pp. 1-10 (2000, ASME, New York).
U.S. Appl. No. 10/660,522, Käfer, filed Sep. 12, 2003.
U.S. Appl. No. 10/660,523, Käfer, filed Sep. 12, 2003.
Search Report for German Patent Appl. No. 102 42 776.3 (Jul. 29, 2005).
Search Report from GB 0321471.5 (Feb. 25, 2004).

* cited by examiner

*Primary Examiner*—Edward M. Johnson
(74) *Attorney, Agent, or Firm*—Cermak & Kenealy, LLP; Adam J. Cermak

(57) ABSTRACT

In a method for operating a flue gas purification plant (10) including a plurality of parallel of absorber chambers (11), in which in each absorber chamber (11), CO and NO are simultaneously oxidized by a catalyst in a first absorber (15) according to the SCONOx principle and the resulting $NO_2$ is absorbed on the catalyst surface, in which $SO_2$ is furthermore oxidized by a catalyst in a second absorber (14) upstream of the first absorber (15) according to the SCOSOx principle and the resulting $SO_3$ is absorbed on the catalyst surface. The absorber chambers (11) are successively regenerated by a regeneration gas containing hydrogen and/or hydrogen compounds in regularly repeating regeneration cycles affecting all the absorber chambers (11). In order to improve reliability and reduce operating costs in such a method, the regeneration time of the second absorber (14) within the regeneration cycle is respectively selected to be long enough to guarantee sufficient regeneration of the second absorber (14).

6 Claims, 1 Drawing Sheet

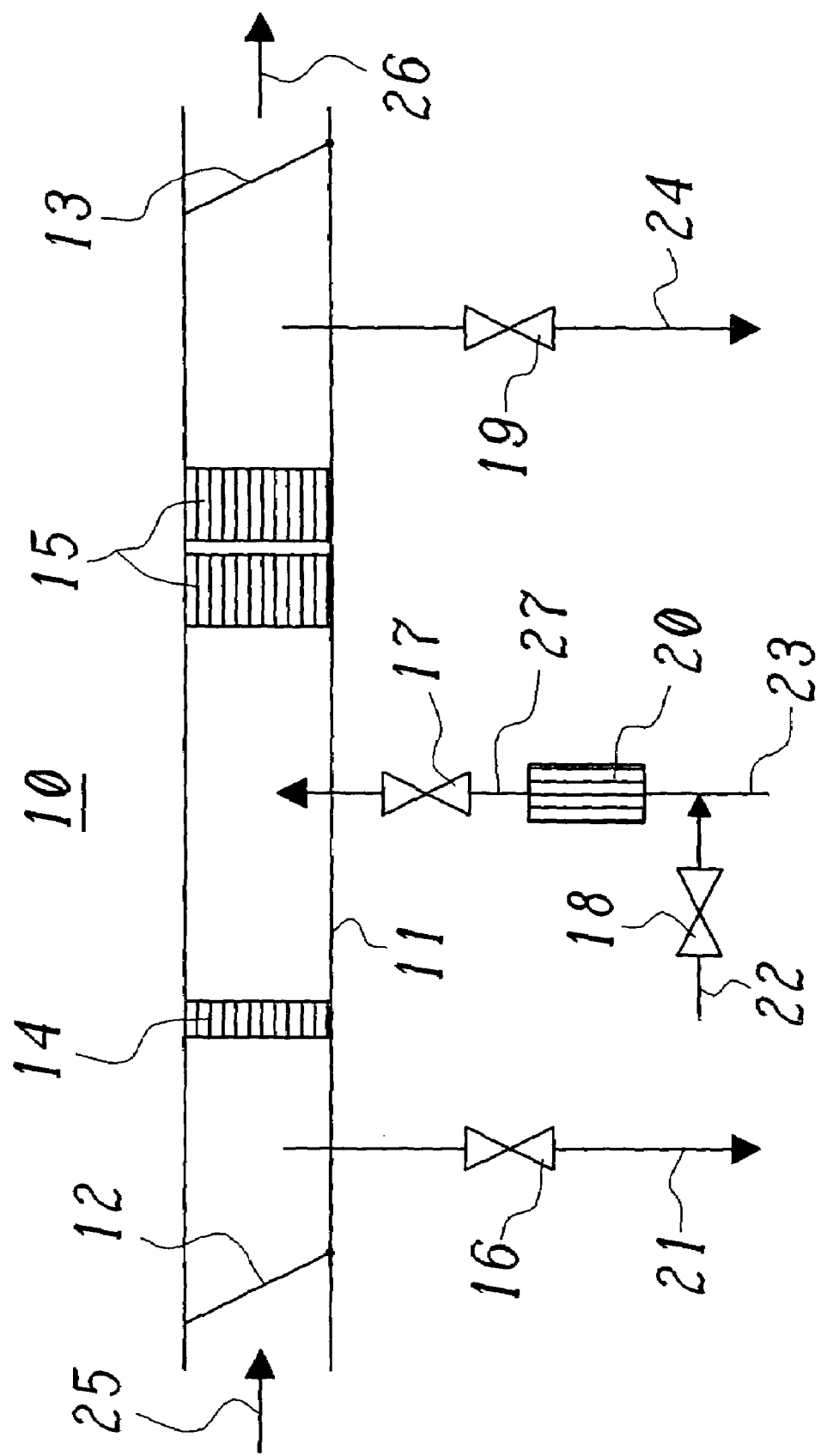

METHOD FOR OPERATING A FLUE GAS PURIFICATION PLANT

BACKGROUND OF THE INVENTION

1. Field of the Invention

The present invention concerns the field of flue gas purification technology, and to a method for operating a flue gas purification plant.

2. Discussion of Background

The brand name SCONOx describes a relatively new process for reducing NOx emissions in combustion flue gases of gas turbines, diesel engines and the like. NOx is deposited as potassium nitrite and potassium nitrate on an SCONOx absorber (see U.S. Pat. No. 5,953,911 and the article by L. Czarnecki et al., SCONOx—Ammonia Free NOx Removal Technology for Gas Turbines, Proc. of 2000 Int. Joint Power Generation Conf., Miami Beach, Fla., Jul. 23–26, 2000).

Since it is easy for the SCONOx absorber to be deactivated by $SO_2$ in the flue gas, another absorber is connected upstream of it—a so-called SCOSOx absorber—which absorbs $SO_2$ from the flue gas and hence protects the SCONOx absorber. The chemical reactions taking place in the two absorbers are described in detail in the aforementioned article by L. Czarnecki.

As soon as the deposition capacity of at least one of the absorber types has been exhausted (typically after about 20 minutes), the absorbers need to be regenerated. This is done by subdividing the overall absorber into individual chambers, which can be individually disconnected from the flue gas stream by using switchable dampers. For regeneration, selected chambers are disconnected from the flue gas stream while the other chambers remain in the flue gas stream. A regeneration gas, which consists of hydrogen, natural gas or other hydrocarbons and an oxygen-free carrier gas (usually steam), is passed through the disconnected chambers in order to regenerate both the NOx absorbers and the $SO_2$ absorbers of the chambers in question. However, since the two different absorber types respond differently during the regeneration, they are regenerated separately. This is made possible by an arrangement of feed and discharge lines and valves for the regeneration as reproduced by way of example in the single figure.

The figure shows an absorber chamber 11 of a flue gas purification plant 10, through which flue gas to be purified is sent from a combustion process. The unpurified flue gas 25 flows into the chamber 11 from the left. The purified flue gas 26 flows out of the chamber 11 again toward the right. The chamber 11 can be disconnected from the flue gas stream for regeneration purposes using two dampers 12 and 13, which are arranged at the input and the output. In the figure, the dampers 12, 13 have already been closed.

In the chamber 11, a first absorber 14 (SCOSOx) for absorbing $SO_2$ and a second absorber 15 (SCONOx) for absorbing NOx are arranged successively spaced apart in the flow direction. A feed line 27 for the regeneration gas opens via a first valve 17 (inlet valve) into the intermediate space between the first and second absorbers 14 and 15. Discharge lines 21 and 24, in which a second valve 16 and a third valve 19 (outlet valves) are respectively fitted, are connected before the first absorber 14 and after the second absorber 15, as seen in the flow direction. Within a regeneration phase, the first valve (inlet valve) 17 is opened so that regeneration gas can flow in. The other two valves (outlet valves) 16 and 19 are opened in succession, so that the associated absorbers 14 and 15 can be regenerated successively. The $SO_2$ absorber 14 is usually regenerated first (valves 16 open; valve 19 closed). The regeneration gas in the feed line 27 is produced from steam 23, by means of a reformer 20, and natural gas 22 containing methane delivered though a valve 18.

In the flue gas purification plant 10, typically about ten chambers 11 of the type represented in the figure are connected in parallel, two of which will be in the regeneration phase at any given time. With a regeneration time of 5 minutes per individual regeneration, 25 minutes are required in total to regenerate each of the chambers 11 once (=25-minute cycle time).

Currently, both the SCOSOx absorbers and the SCONOx absorbers, or the relevant catalysts, are regenerated during each regeneration cycle. During the regeneration of the SCOSOx absorber, all oxygen which is absorbed on the catalytic surface of the absorber must first be consumed by the regeneration gas before the release of absorbed $SO_2$ that takes place during the regeneration can begin. This prior oxygen depletion takes some time and consumes a significant amount of hydrogen. About 70% of the total regeneration time of 5 minutes is therefore expended for the regeneration of the SCOSOx absorber 14. So that enough hydrogen is available for the regeneration of the SCONOx absorber 15 over the remaining 30% of the regeneration time, a comparatively high hydrogen concentration is required in the regeneration gas. A high hydrogen concentration raises safety questions and can be provided only if the reformer 20, which is responsible for generating hydrogen from natural gas, operates at quite a high temperature level. Any increase in the operating temperature of the reformer, however, entails a significant rise in the operating costs, since the temperature of the regeneration gas as a whole needs to be increased.

SUMMARY OF THE INVENTION

Accordingly, one object of the invention is to provide a novel method for operating an SCONOx flue gas purification plant, which is distinguished by improved reliability and reduced operating costs.

One aspect of the invention is that more time is made available for the regeneration of the second absorber (SCOSOx absorber) without compromising the regeneration of the first absorber.

In preferred configuration of the method according to the invention, each absorber chamber is allocated a regeneration time within the regeneration cycle, for full regeneration of an absorber chamber in the regeneration time the second absorber is first regenerated in a first time segment and the first absorber is regenerated in a subsequent second time segment, and the first time segment lasts at least about 5 minutes. The second time segment preferably lasts at least about 3 minutes. The extension of the regeneration time for the second absorber, and the regeneration time overall, guarantees sufficient regeneration of both absorbers.

It is particularly advantageous, according to another configuration of the invention, for the first and second absorbers to be regenerated independently of one another; in particular the first absorbers of the absorber chambers are regenerated in a first regeneration cycle, and the second absorbers of the absorber chambers are regenerated in a second regeneration cycle. A lower hydrogen concentration in the regeneration gas can in this way be tolerated without detrimentally affecting the regeneration quality. Safety considerations can therefore be relaxed and a lower operating temperature may be selected for the reformer. The risk of SCONOx deactivation is furthermore reduced significantly because the SCOSOx regeneration is carried out less often.

Lastly, less hydrogen or hydrocarbons, for example natural gas, is wasted for the reduction of the absorber at the start of each regeneration cycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The single FIGURE shows the exemplary layout of an individual chamber with SCONOx and SCOSOx absorbers and regeneration devices, in a flue gas purification plant such as may be used for carrying out the invention.

DESCRIPTION OF THE PREFERRED EMBODIMENTS

Referring now to the drawings, wherein like reference numerals designate identical or corresponding parts throughout the several views, it is in particular proposed according to the invention that the SCOSOx catalyst of the SCOSOx absorber be regenerated less often, specifically only once every 2 to 24 hours depending on the sulfur content in the combusted fuel, and that the remaining regeneration time be used exclusively for the regeneration of the SCONOx absorber 15. It may be estimated that the capacity of the SCOSOx absorber is sufficient for at least 48 hours of continuous operation in the case of gas firing.

The preferred less frequent regeneration of the SCOSOx absorber 15 offers various important advantages:

a. Since virtually the entire regeneration time can be given over to the regeneration of the SCONOx absorber 15, a lower hydrogen concentration in the regeneration gas can be tolerated without detrimentally affecting the regeneration quality. Safety considerations can therefore be relaxed and a lower operating temperature may be selected for the reformer 20. This is a substantial advantage of the proposed operating method, especially since there remain questions and risks due the required operating temperature of the reformer 20. A steam temperature of from 300 to 350° C. ought to be sufficient in the proposed operating mode.

b. The regeneration of the SCOSOx absorber 14 is not complete even after 70% of the total regeneration time, which is typically 5 minutes. This means that a significant concentration of $SO_2$ released during the regeneration still remains in the chamber 11 when the system is switched over to regeneration of the SCONOx absorber 15 (closing the valve 16; opening the valve 19). There is a risk that some of the $SO_2$ may enter the SCONOx absorber 15 by diffusion or turbulence when the regeneration gas is blown in. It may even be flushed into the SCONOx absorber 15 by the flue gas wherein the dampers 12, 13 are opened at the end of the regeneration process. For this reason, any SCOSOx regeneration may potentially cause some deactivation of the SCONOx catalyst. The risk of SCONOx deactivation by the described mechanism is significantly reduced in the proposed operating mode because the SCOSOx regeneration is carried out less often.

c. The hydrocarbon consumption for the regeneration is reduced because only the SCONOx catalyst is being regenerated for most of the time. Less hydrogen or hydrocarbons is therefore wasted for the reduction of the absorber at the start of each regeneration cycle.

The proposed operating method can be used for all SCONOx plants in which flue gas with an $SO_2$ content of less than about 2 ppm is treated. This means that it can be used in gas turbines which are operated using natural gas with a low-sulfur petroleum distillate.

Since propane or higher hydrocarbons can be converted into hydrogen more easily than can methane (the main component of natural gas), this may constitute an alternative to natural gas subject to local availability. It is also conceivable to use higher hydrocarbons directly for the regeneration, without prior reforming into hydrogen.

It is recommendable to carry out the SCOSOx regeneration for at least 5 minutes, in order to guarantee sufficient regeneration of the absorber. Therefore, either the SCONOx regeneration should be fully avoided during the SCOSOx regeneration, or the overall regeneration time for both absorbers should be extended to 8 minutes, for example, in order to leave some time available for the SCONOx regeneration. Since, however, the SCONOx regeneration is impaired during the periodic SCOSOx regeneration, irrespective of the time at which the SCOSOx regeneration is arranged, it may be necessary and advantageous to distribute the SCOSOx regeneration over a longer time period in order to avoid excessive NOx values in the chimney stack. It may therefore be better to regenerate only the $SO_2$ absorbers of one chamber in each cycle, instead of all the $SO_2$ absorbers per cycle. This means that (with 10 chambers) all the $SO_2$ absorbers will have been regenerated once after 10 cycles, corresponding typically to 250 minutes.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

10 Flue gas purification plant
11 Absorber chamber
12, 13 Damper
14 Absorber (SCOSOx)
15 Absorber (SCONOx)
16, . . . , 19 Valve
20 Reformer
21, 24 Discharge line (regeneration)
22 Natural gas (NG)
23 Steam
25 Flue gas (unpurified)
26 Flue gas (purified)
27 Feed line (regeneration)

What is claimed as new desired to be secured by Letters Patent of the United States is:

1. A method for operating a flue gas purification plant having a plurality of parallel absorber chambers, the method comprising:

simultaneously oxidizing CO and NO in each absorber chamber with a first single catalyst in a first absorber, and absorbing the resulting $NO_2$ on the catalyst surface;

oxidizing $SO_2$ with a second catalyst in a second absorber upstream of the first absorber, and absorbing the resulting $SO_3$ on the catalyst surface;

successively regenerating the absorber chambers with a regeneration gas containing hydrogen, hydrogen compounds, or both, in regularly repeating regeneration cycles affecting all the absorber chambers; and selecting the regeneration time of the second absorber within each of said regeneration cycles to be long enough for regeneration of the second absorber.

2. The method as claimed in claim 1, comprising:

allocating a regeneration time for each absorber chamber within the regeneration cycle;

regenerating the second absorber in a first time segment; and regenerating the first absorber in a subsequent second time segment, wherein the first time segment is at least about 5 minutes, for full regeneration of an absorber chamber in the regeneration time.

3. The method as claimed in claim 2, wherein the second time segment is at least about 3 minutes.

4. The method as claimed in claim 1, comprising regenerating the first and second absorbers independently of one another.

5. The method as claimed in claim 1, comprising:

regenerating the first absorbers of the absorber chambers in a first regeneration cycle; and regenerating the second absorbers of the absorber chambers in a second regeneration cycle;

wherein the second regeneration cycle lasts substantially longer than the first regeneration cycle.

6. The method as claimed in claim 5, wherein only the second absorber of an absorber chamber is regenerated in each first regeneration cycle.

* * * * *